Dec. 29, 1964   T. C. DAVIS ETAL   3,162,992
CABLE INSTALLING AND WRAPPING APPARATUS
Filed Dec. 20, 1962   6 Sheets-Sheet 1

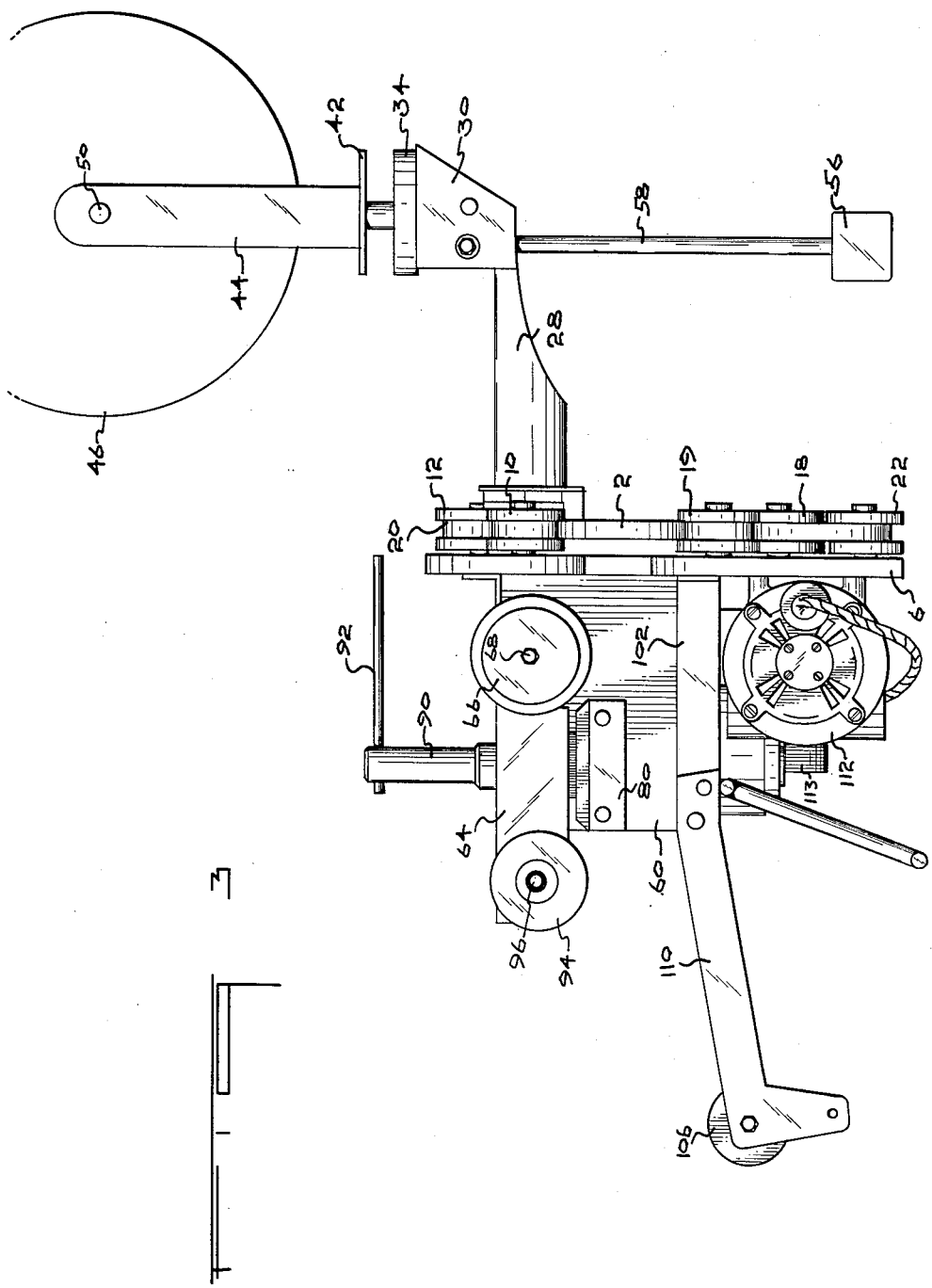

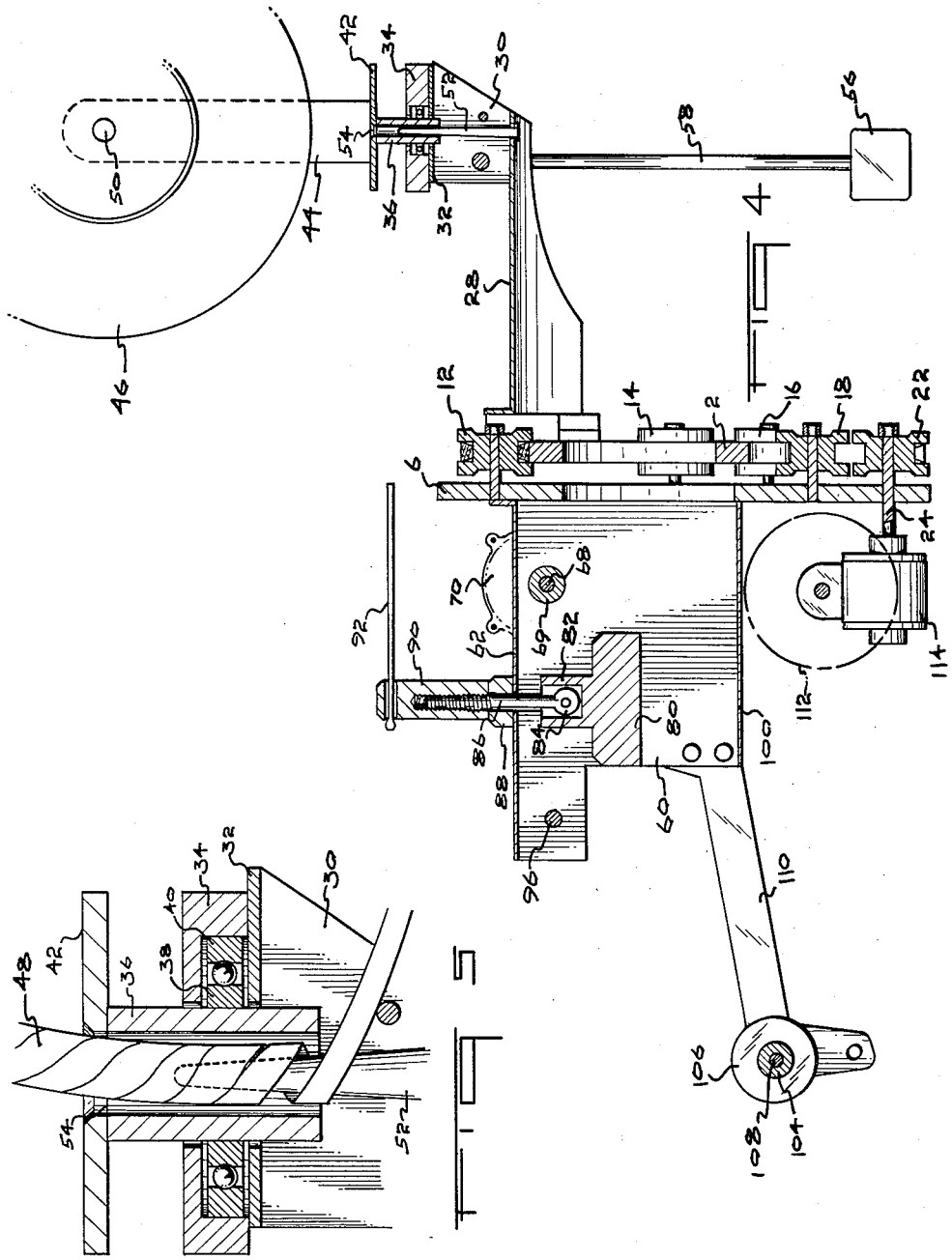

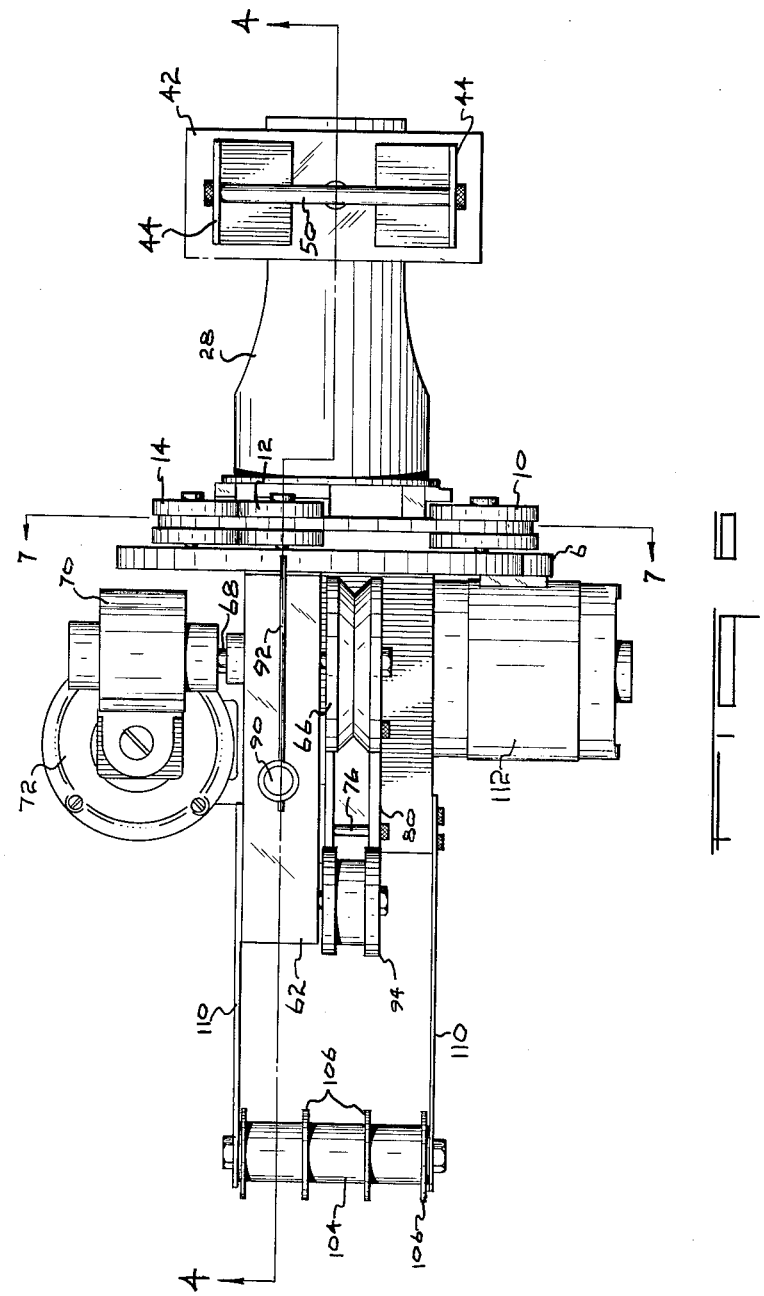

Dec. 29, 1964   T. C. DAVIS ETAL   3,162,992
CABLE INSTALLING AND WRAPPING APPARATUS
Filed Dec. 20, 1962   6 Sheets-Sheet 6

United States Patent Office 3,162,992
Patented Dec. 29, 1964

3,162,992
CABLE INSTALLING AND WRAPPING
APPARATUS
Thomas C. Davis, Dallas, and Jack W. Willis, Irving,
Tex., assignors to AMP Incorporated, Harrisburg, Pa.
Filed Dec. 20, 1962, Ser. No. 246,115
3 Claims. (Cl. 57—10)

This invention relates to apparatus for installing cables or conductors on utility poles and for applying resilient helical ribbon wrapping material to cables and conductors.

An object of the invention is to provide an improved device for wrapping cables or the like with resilient helical ribbon wrapping material. A further object is to provide a wrapping device for helical ribbon wrapping material having self-contained power means for simultaneously propelling the device along the cable being wrapped and for applying the wrapping material. A further object is to provide a device capable of applying helical wrapping material to cables which extend between utility poles or have otherwise been installed in their operating environments. A still further object is to provide a device for simultaneously installing conductor cables on utility poles and simultaneously applying a wrapping material to the cables.

These and other objects of the invention are achieved in a preferred embodiment thereof comprising a support ring which surrounds the cables being wrapped. A reel of helical wrapping material is mounted on the support ring and the ring itself is rotatable in its own plane so that upon such rotation of the ring, the reel of wrapping material revolves, planetary fashion, about the cables being wrapped. Means are provided for moving the support ring axially along the cables during rotation of the ring so that a continuous wrapping of helical ribbon wrapping material can be applied along the length of the cables being wrapped. A preferred embodiment of the invention is intended to be used in circumstances where a so-called messenger cable is provided close to the actual insulated conductor cables. The wrapping apparatus is intended to be mounted on the messenger cable and to wrap the wrapping material around the messenger cable and the conductors as a bundle. During movement of the apparatus along the messenger cable, it picks up the conductor cables being installed and thereby simultaneously both aids in the installation of the conductor cables and wraps them neatly to the messenger cable.

In the drawing:

FIGURE 3 is a profile view of the preferred embodiment looking from the left in FIGURE 1.

FIGURE 4 is a sectional profile view taken along the lines 4—4 of FIGURES 6.

FIGURE 5 is an enlarged sectional view showing details of the support for the reel of wrapping material and the mandrel over which the wrapping material is drawn.

FIGURE 6 is a top plan view of the preferred form of the invention.

Figure 1:
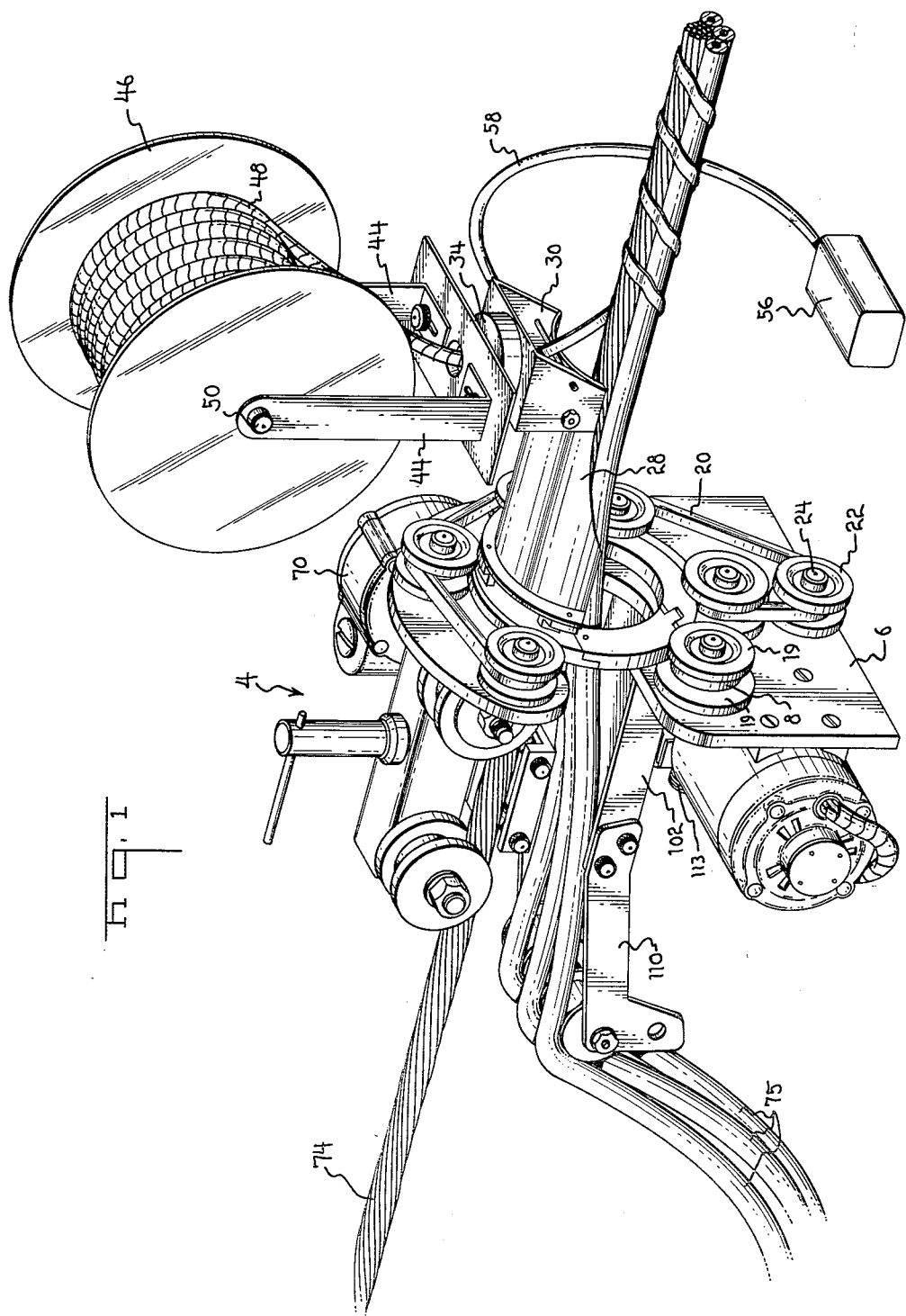
FIGURE 1 is a perspective view showing a preferred form of the invention mounted on a messenger cable and illustrating the manner in which the conductor cables are simultaneously installed and wrapped with helcial wrapping material.

Plastic ribbon wrapping material of the type applied by the apparatus of the instant invention is ordinarily manufactured by simply cutting a plastic tube along a helical line extending around the axis of the tubing. The cut tubing will normally retain the original cylindrical shape of the uncut tubing and can be unraveled and wrapped around cables to hold them in a neat bundle. After wrapping, the resulting helical ribbon constricts itself about the cables by virtue of the inherent tendency of the material to return to its original diameter. An advantage of wrapping material of this type is that the adjacent turns of the wrapping material can be spaced relatively closely together if a heavy material is being wrapped or if substantial support for the wrapped cables is required or the turns can be spaced relatively far apart if the cables are relatively light in weight. U.S. Patent 3,029,586 discloses one type of apparatus for applying wrapping material of this type to cables.

A preferred apparatus in accordance with the present invention comprises a support ring 2 (FIGURES 1 and 2) having a central opening through which the cables being wrapped are adapted to extend during operation. Support ring 2 is mounted for rotation about its center adjacent to a plate 6 which constitutes a portion of a carriage generally indicated at 4 by means of which the apparatus is moved along the cables. The ring is held on its periphery by means of a plurality of flanged rolls 8, 10, 12, 14, 16, and 18 mounted for free rotation on stub shafts extending from plate 6. The flanges on the sides of these rolls (e.g. flanges 19 on roll 8) overlap the periphery of the ring 2 thereby to support the ring for rotation in its own plane. Counterclockwise rotary motion is imparted to the ring 2 as viewed in FIGURES 1 and 2 by means of a belt 20 which extends around the edge of the ring from the roll 18 to the roll 10 thence around the roll 10, over the intervening rolls 12, 14 and 16 to a drive roll 22 which is secured to a drive shaft 24. The drive shaft in turn extends through plate 6 to a right angle drive 114 which in turn is coupled to a variable speed electric motor 112. In order to permit the apparatus to be mounted on a previously installed cable, support ring 2 has a hinged section 26 which can be opened to provide a gap in the ring and thereby permit placement of the apparatus on the cable 74 as described more fully below.

An arcuate flange 28 secured to the face of the ring 2 extends rearwardly of the apparatus and has a support channel 30 mounted on its end. A cylindrical bearing housing 34 is fixed to the outside surface of the web 32 of channel 30 and a hub or spindle 36 extends downwardly as viewed in FIGURES 4 and 5 through a central opening in housing 34 and web 32. An inner ball bearing race 38 is fixed to the spindle 36 and an outer race 40 is secured to a counterbore in housing 34 so that the spindle is free to rotate about its central axis relative to the mounting structure 32, 34.

A plate 42 is integral with the projecting end of spindle 36 and a pair of parallel reel support arm 44 are in turn secured to the surface of the plate. A reel 46 of helical wrapping material 48 is mounted on a shaft 50 extending between the ends of the arms 44. The wrapping material from the reel is threaded through a central opening 54 in spindle 36 and over a slightly tapered mandrel 52 mounted on the end of flange 28 and extending axially into the opening 54. As the helical ribbon wrapping material is drawn from the supply reel as described below, it is unraveled by this mandrel and re-wrapped about the cables 74, 75.

Since the reel continuously revolves in a planetary fashion about the cables being wrapped, it is desirable to counterbalance the weight of the wrapping material. To this end a counterweight 56 is provided on the end of an arcuate arm 58 secured to flange 28 at a location diametrically opposite from that of the reel of wrapping material.

The carriage 4 comprises a frame plate 60 secured to, and extending normally of, the previously mentioned plate 6. On its upper end, as viewed in FIGURES 1 and 2, plate 60 has an inwardly directed flange 62 with a downwardly turned end portion 64. A drive roll 66 having a V-shaped groove in its periphery is secured to a shaft 68 extending normally of plate 60 and through a suitable bearing 69 disposed between the plate 60 and the downwardly turned edge 64. Shaft 68 is coupled by means of a right angle drive and speed reducer 70 to a variable speed electric motor 72. This drive roller propels the entire apparatus along the messenger cable 74 and should therefore be held firmly against the surface of the cable in order to establish sufficient frictional force between the roller and the cable. In order to establish such frictional resistance between these members, a pair of support rolls 76, 78 are provided on the underside of the cable and are mounted on the carriage by means of a block 80 in which the axes of the rollers are rotatably journaled. Block 80 is suspended beneath the flange 62 by means of a pivotal connection 84 between an ear 82 of the block and a threaded rod 86. This rod extends upwardly through an opening in flange 62, through a bearing 88 on the upper side of flange 62, and into a threaded opening in a cap nut 90. Advantageously, a relatively elongated handle 92 is provided on the upper end of the cap nut in order to permit raising or lowering of the block 80 by means of a remote control handle mechanism or manipulating device. It will be apparent that when the apparatus is placed on the messenger cable 74 with the drive roll resting upon the cable, raising of the block 80 will have the effect of urging the messenger cable firmly into engagement with the drive roller.

An additional free running guide roll 94 similar to the drive roll 66 is provided on the lefthand end of the carriage on an axis 96 extending through the downwardly turned portion 64 of the flange 62. This roll, in co-operation with the rolls 76, 78, assists in guiding the apparatus along the cable and maintaining the short section of messenger cable between the roll 94 and the roll 66 substantially straight thereby to maintain continuing contact between the messenger cable and the drive roll.

The conductor cables 75 which are being installed are guided over a bottom guide flange 100, extending from the lower end of plate 60, by means of a free running guide roll 104 mounted on a shaft 108 extending between arms 110. These arms are secured to the plate 60 and to a retaining flange 102 on opposite sides of the guide surface 100. Advantageously, spaced-apart collars 106 are provided on the roll 104 in order to keep the conductors 75 separated from each other and to guide them smoothly over the surface 100 and towards the messenger cable 74.

Figure 2:
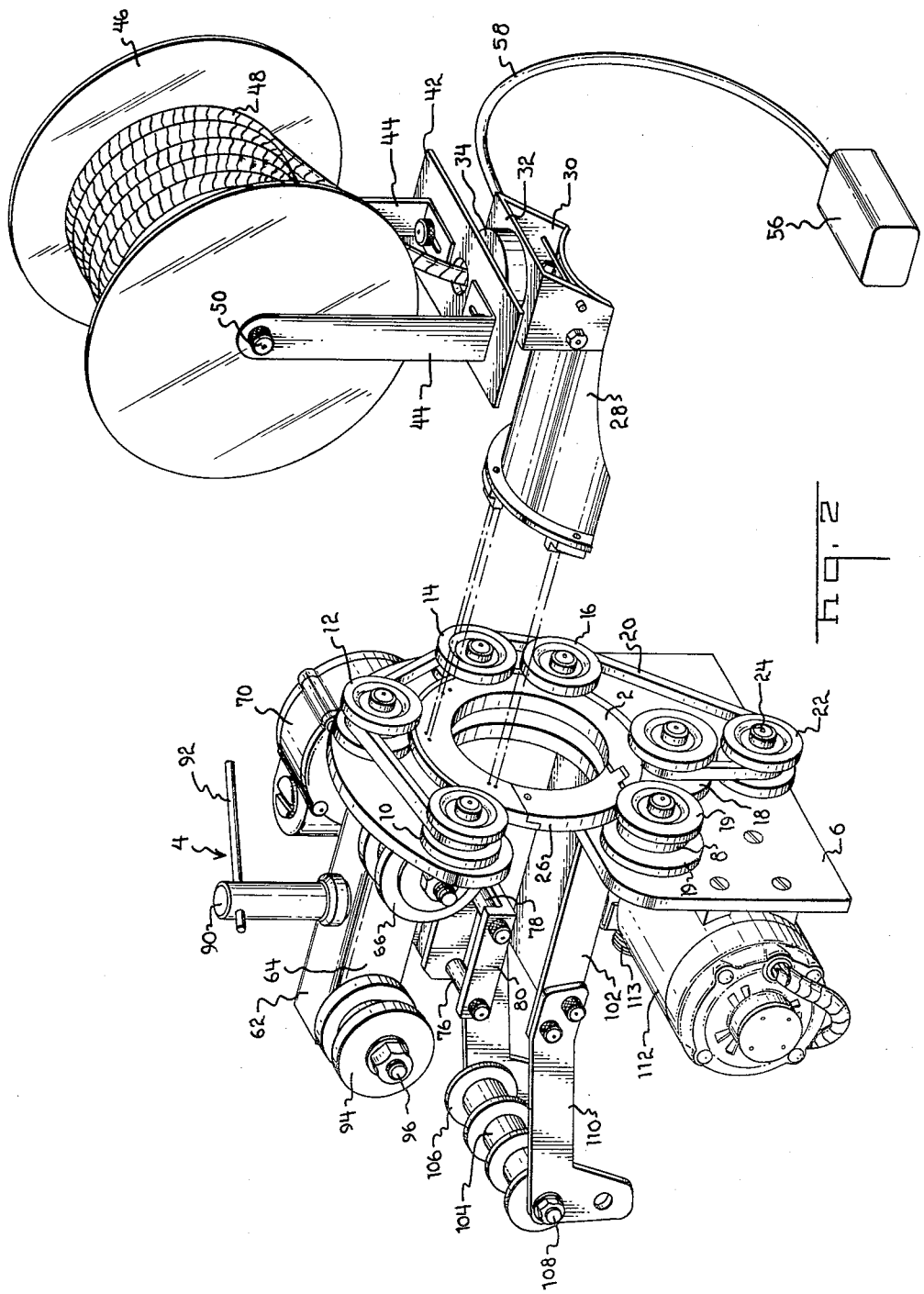
FIGURE 2 is a perspective view similar to FIGURE 1 but showing the reel of wrapping material and its supporting structure exploded from the body of the apparatus.
Figure 7:
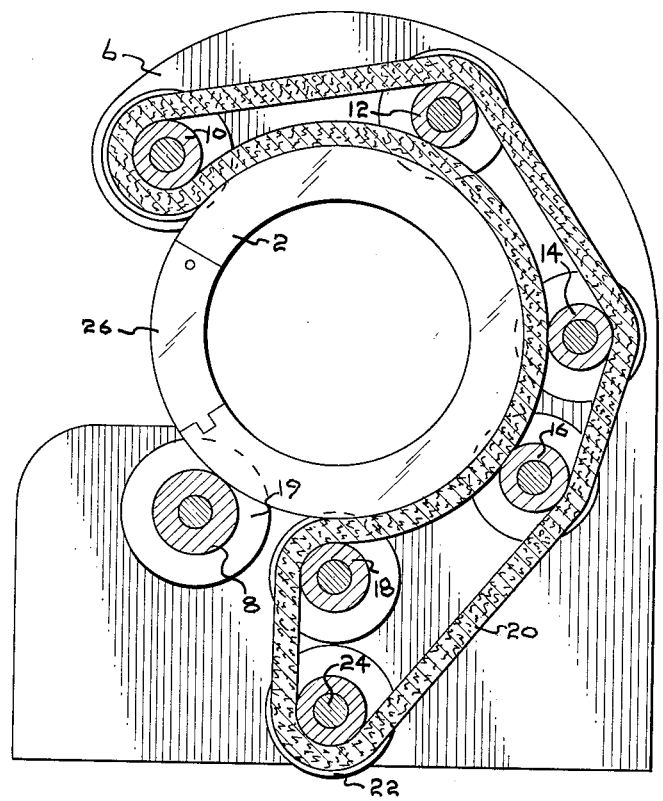
FIGURE 7 is a view taken along the lines 7—7 of FIGURE 6.

FIGURES 1 and 2 illustrate the manner in which the disclosed form of the invention can be employed to simultaneously assist in the installation of conductor cables 75 and to wrap the conductors to the messenger cable 74. These figures assume that the messenger cable 74 has previously been installed and that it extends from one utility pole to a second utility pole while the conductor cables have not yet been installed to the second utility pole. In use, the apparatus is mounted on the messenger cable 74 by opening the hinge section 26 of the support ring and moving it over the messenger cable and over the as yet uninstalled conductor cables 75. The hinge section is then closed, the block 80 is raised by turning of the nut 90 to clamp the messenger cable against the drive roll, and the conductor cables are positioned beneath the block and on the guide roll 104 as shown in FIGURE 1. The helical wrapping material is led through the opening 54 in spindle 36 and a short length of the end of the tubing or wrapping material is led over the mandrel, and around the cable and the conductors to initiate the wrapping operation. Thereafter, the motors 112 and 72 are energized to simultaneously move the apparatus along the messenger cable leftwardly in FIGURE 1 and to rotate the support ring 2 in a counterclockwise direction as viewed in FIGURE 1. As the carriage moves along the messenger cable, the conductor cables 75 are picked up and guided over the roll 104 tangentially towards the messenger cable 74. The movement of the apparatus along the messenger cable places the ribbon of wrapping material which is emergent from the opening 54 in tension and the planetary motion of the reel 46 causes the ribbon to be wrapped around the three conductor cables and the messenger cable. The tension in the emergent ribbon being wrapped onto the cables pulls the necessary additional helical wrapping material from the reel which continuously rotates about the axis defined by the shaft 50 and simultaneously rotates about an axis extending centrally through the opening 54 and through the reel transversely of the axis 50. This latter rotation, that is about the axis of opening 54 and about an axis extending transversely of the longitudinal axis of the reel is brought about by the unraveling of the helical material being withdrawn from the reel. The direction of this rotation will depend upon the precise orientation of the reel with respect to the mounting arms 44; in other words, the direction of rotation of the reel during application would be reversed if the reel were to be removed from the arms 44 and reversed end to end.

Advantageously, the motors 72, 112 are controlled from a remote position by suitable motor control devices of conventional type. The power supply and control cable for the motors 112 and 72 is disengageably connected to the apparatus by means of a multi contact receptacle 113. This cable (not shown) will normally extend to a motor control box which will be attended by an operator during use. By virtue of this arrangement, the individual turns can be either relatively closely spaced together or spaced relatively far apart depending upon the actual requirements of the cables being wrapped. If relatively heavy cables are being wrapped and closely spaced turns are desired, it is merely necessary to speed up the rotational speed of the ring 2 while holding the speed of the motor 112 and therefore the velocity of movement of the apparatus along the cable constant.

Under some circumstances it is desired to apply wrappings to previously installed cables extending between utility poles rather than to simultaneously install the conductor cables and apply the wrapping material. Where previously installed cables are being wrapped, the operation is substantially the same as described above except that the conductor cables 75 would extend more nearly parallel to the messenger cable 74 in FIGURE 1.

While the disclosed embodiment of the invention is particularly adapted to apply wrapping material which is drawn from a supply reel, it will also be apparent that the wrapping material might be drawn from a hank or coil contained in a box. Reference is made to U.S. Patent 3,059,404 for a teaching of a stationary applying device which is adapted to apply wrapping material drawn from a storing device of this type. In order to adapt the instant device to usage with such coiled wrapping material as shown in the above identified patent, the box containing the coil would be mounted rotatably on the revolving support flange 28 in the manner shown in U.S. Patent 3,059,404.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:
1. A device for applying helical ribbon wrapping material to a cable comprising, a carriage, a drive roll on said carriage and means for pressing said cable against said drive roll, variable speed drive means for rotating said drive roll thereby to propel said carriage along said cable, a support ring, a plurality of support rolls on said carriage, said support rolls having flanges on their ends and being spaced in surrounding relationship to said ring with said flanges overlapping said ring thereby to hold said ring on said carriage, variable speed rotating means for rotating said support ring, a supply of helical ribbon wrapping material mounted on said support ring, and means mounted on said ring for guiding and unraveling said wrapping material as said carriage moves along said cable whereby said material is continuously applied to said cable.

2. A device as set forth in claim 1 wherein said supply of helical ribbon wrapping material is in the form of a reel of said material.

3. A device as set forth in claim 1 wherein said means for rotating said ring comprises an endless belt extending between at least one of said support rolls and said ring, and including means for moving said belt.

References Cited in the file of this patent
UNITED STATES PATENTS

| | | |
|---|---|---|
| 2,271,528 | Pfohl et al. | Feb. 3, 1942 |
| 2,388,018 | Stover | Oct. 30, 1945 |
| 2,471,580 | Perrault et al. | May 31, 1949 |
| 2,479,635 | Neale | Aug. 23, 1949 |
| 2,733,753 | Schlesselman et al. | Feb. 7, 1956 |
| 2,923,486 | Betzel | Feb. 2, 1960 |
| 3,029,586 | Walsh et al. | Apr. 17, 1962 |
| 3,032,959 | Benfer et al. | May 8, 1962 |
| 3,059,404 | Benfer et al. | Oct. 23, 1962 |